United States Patent

Wada et al.

[15] 3,679,822

[45] July 25, 1972

[54] SIGNAL COMPENSATION SYSTEM IN RECORDING AND REPRODUCING APPARATUS

[72] Inventors: Yoshiyo Wada; Hisao Kinjo, both of Yokohama; Keigo Okana, Tokyo, all of Japan

[73] Assignee: Victor Company of Japan, Ltd., Kanagawa-ku, Yokohama, Japan

[22] Filed: May 22, 1970

[21] Appl. No.: 39,758

[30] Foreign Application Priority Data

May 24, 1969 Japan....................................44/39954

[52] U.S. Cl..................178/6.6 DO, 178/6.6 DD, 178/6.6 HS

[51] Int. Cl.....................G11b 5/82, G11b 21/04, H04n 5/78

[58] Field of Search.....................178/6.6 A, 6.6 SF, 6.6 DD, 178/6.6 DO, 6.6 FS, 6.6 HS

[56] References Cited

UNITED STATES PATENTS

| | | | |
|---|---|---|---|
| 3,548,095 | 12/1970 | Poulett | 178/6.6 FS |
| 3,152,223 | 10/1964 | Wessels | 178/6.6 SF |
| 3,539,712 | 11/1970 | Stephens | 178/6.6 SF |
| 3,509,274 | 4/1970 | Kihara | 178/6.6. DD |

*Primary Examiner*—Howard W. Britton
*Attorney*—Louis Bernat

[57] ABSTRACT

The system compensates for an absence of a reproduced signal in one channel with a portion of a reproduced signal in another channel. The compensating signal contains its information which is interrelated with that of the signal absence portion. The compensation is performed by a switching pulse having its width corresponding to an interval of the signal absence portion.

10 Claims, 27 Drawing Figures

INVENTORS
YOSHIYO WADA
HISAO KINJO
KEIGO OKANO
BY [signature] ATTORNEY

INVENTORS
YOSHIYO WADA
HISAO KINJO
KEIGO OKANO
BY [signature]
ATTORNEY

SIGNAL COMPENSATION SYSTEM IN RECORDING AND REPRODUCING APPARATUS

This invention relates to a video signal compensation system, and more particularly to a system for compensating for an absent portion of signal as a dropout, transient or the like in a signal reproduced from a recording and reproducing apparatus.

In general, the signal absences or dropouts of any reproduced from the magnetic recording and reproducing apparatus degrade a reproduced picture. There has been a conventional system for compensating the dropouts. This conventional system has a switching gate circuit supplied with a first signal which is directly transmitted and a second signal which is transmitted through a 1H delay line respectively from the input terminal, on which a reproduced signal is applied. The switching gate circuit passes normally the first signal. When there is a dropout in the first signal, the gate circuit passes the second signal. The second signal is delayed relative to the first signal by one horizontal scanning line period (1H:63.5 $\mu$sec. in NTSC system). Thus the signal compensation is attained. However, in this prior art system, it is impossible to compensate for either the entire dropout of the reproduced signal if a portion before 1H is absent or if a dropout of the reproduced signal extends over 1H. In practice, the signal dropout caused by dust, damage or the like on the surface of the magnetic recording and reproducing medium very often covers 1H or more periods. Therefore, a complete and effective compensation was nearly impossible for the signal dropout by ordinary conventional systems.

Accordingly, a general object of the present invention is to provide a video compensation system which can remove the disadvantages of the conventional system. The video system can compensate for a signal absence responsive to a dropout, transient and the like in a reproduced signal effectively by a substitute signal.

Another object of the invention is to provide a video signal compensation system, in the recording and reproducing apparatus, which permits full compensation for a signal absence extending over a long interval which is more than 1H in a reproduced signal.

A further object of the invention is to provide a video signal compensation system which permits compensation of a signal absence in a reproduced signal of a channel. Here, the system substitutes the signal with a signal of another channel.

Still further object of the invention is to provide a video signal compensation system which is adapted for use in apparatus for recording and reproducing a video signal in one field or in a multiple number of fields, for each rotation of a rotary recording medium such as a rotary disk.

These and other objects and features of the invention will become apparent from the description set forth hereinafter when considered in conjunction with the accompanying drawings, in which.

Figure 3:
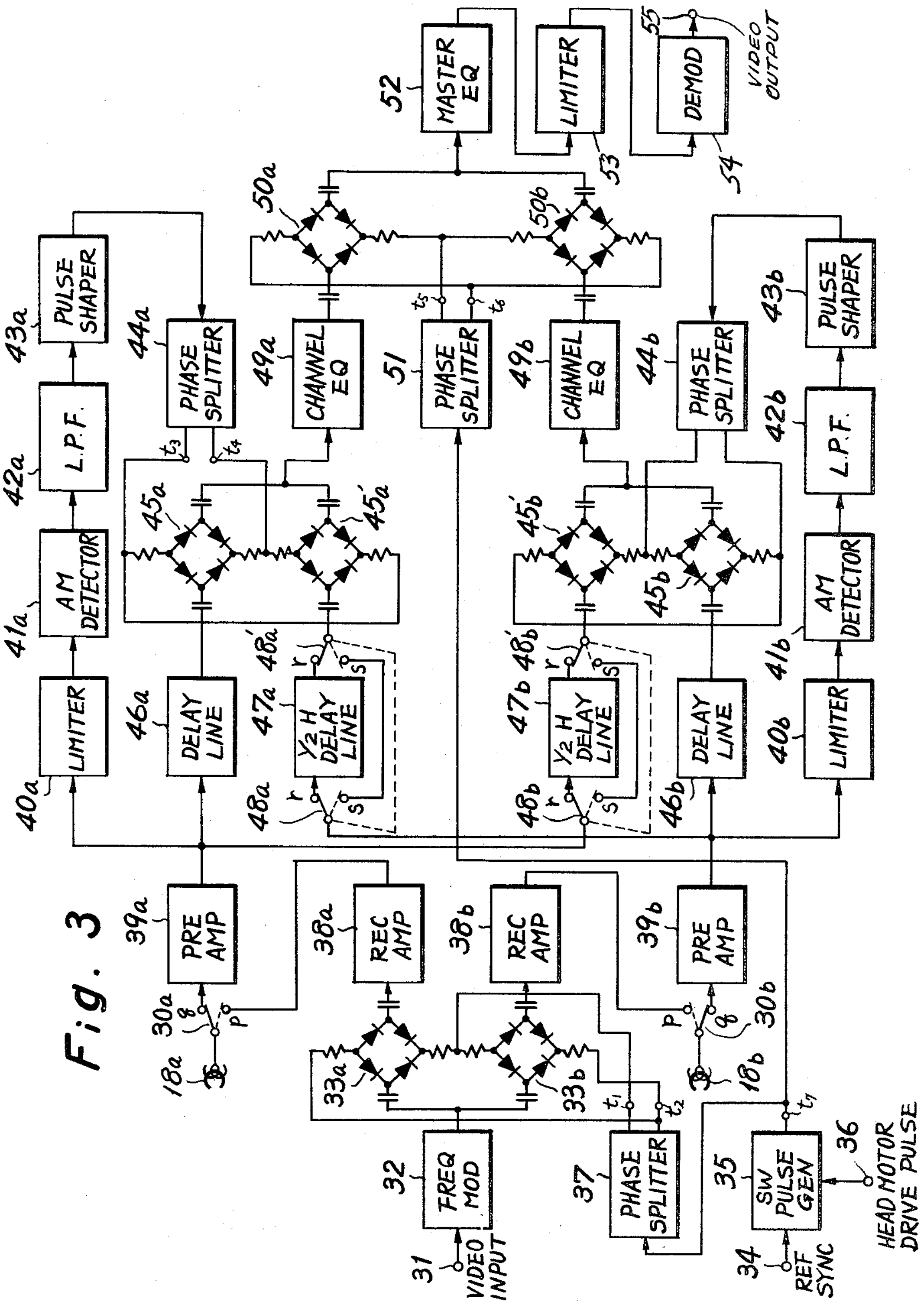
FIG. 3 is a block diagram of a first embodiment of the system according to this invention.

FIGS. 4A–E are graphs showing waveforms of signals at each part of the block diagram shown in FIG. 3.

Figure 2:
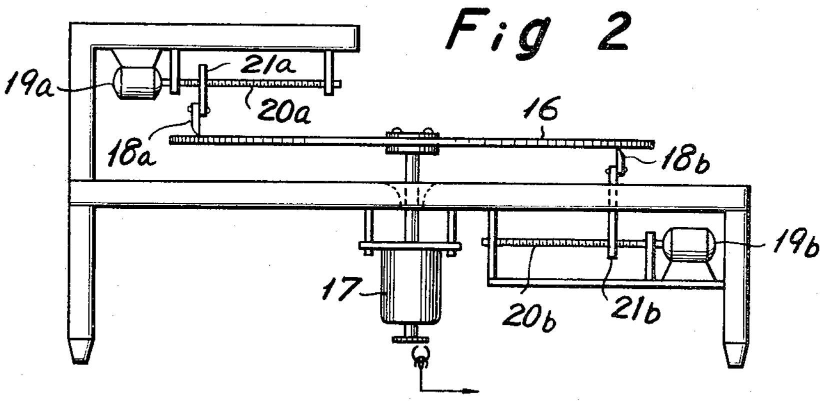
FIG. 2 is a side elevation of an embodiment of a magnetic recording and reproducing apparatus employing a rotary recording medium which can be used for carrying the present invention into practice.
Figure 5:
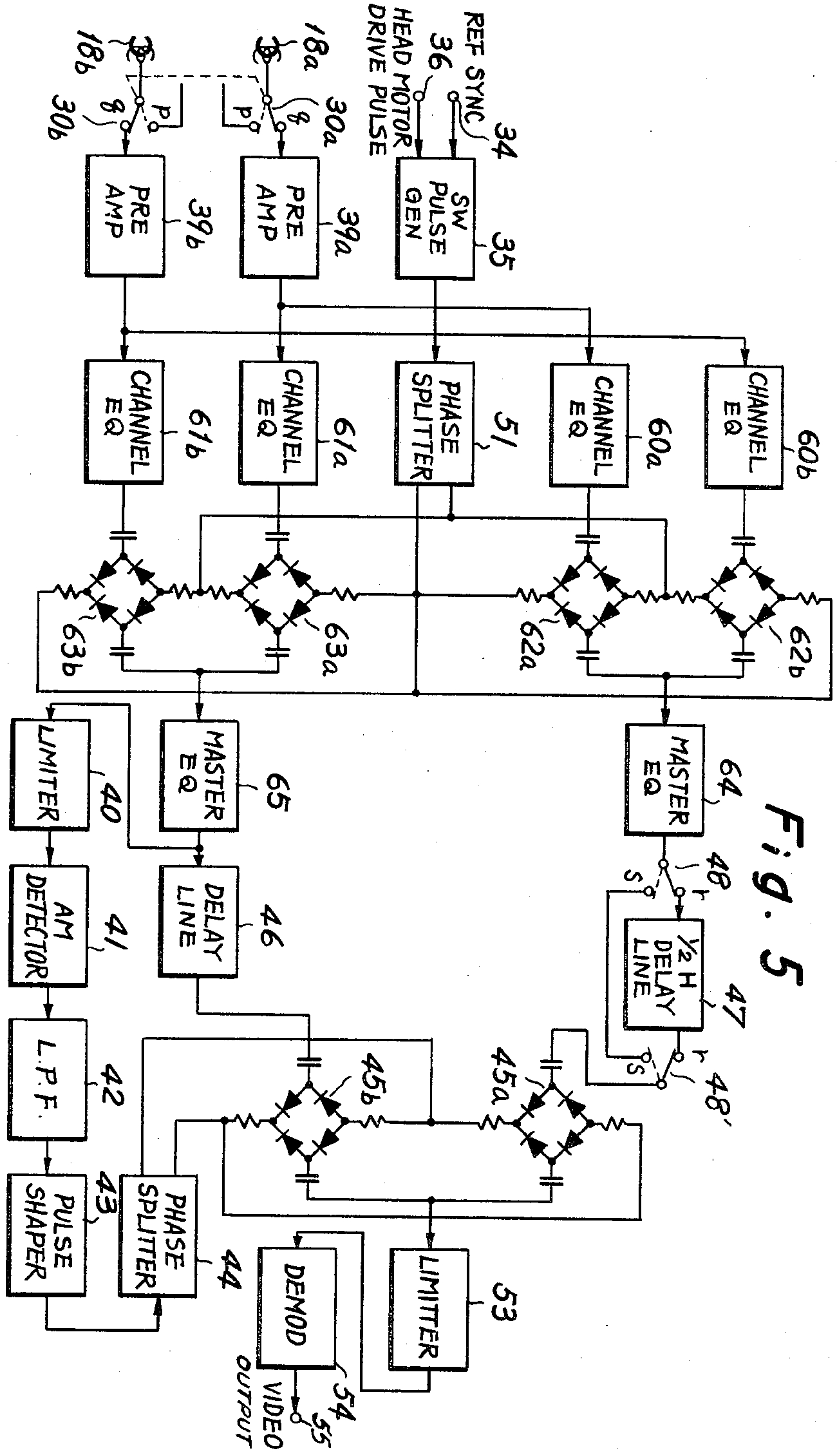
Figure 6:
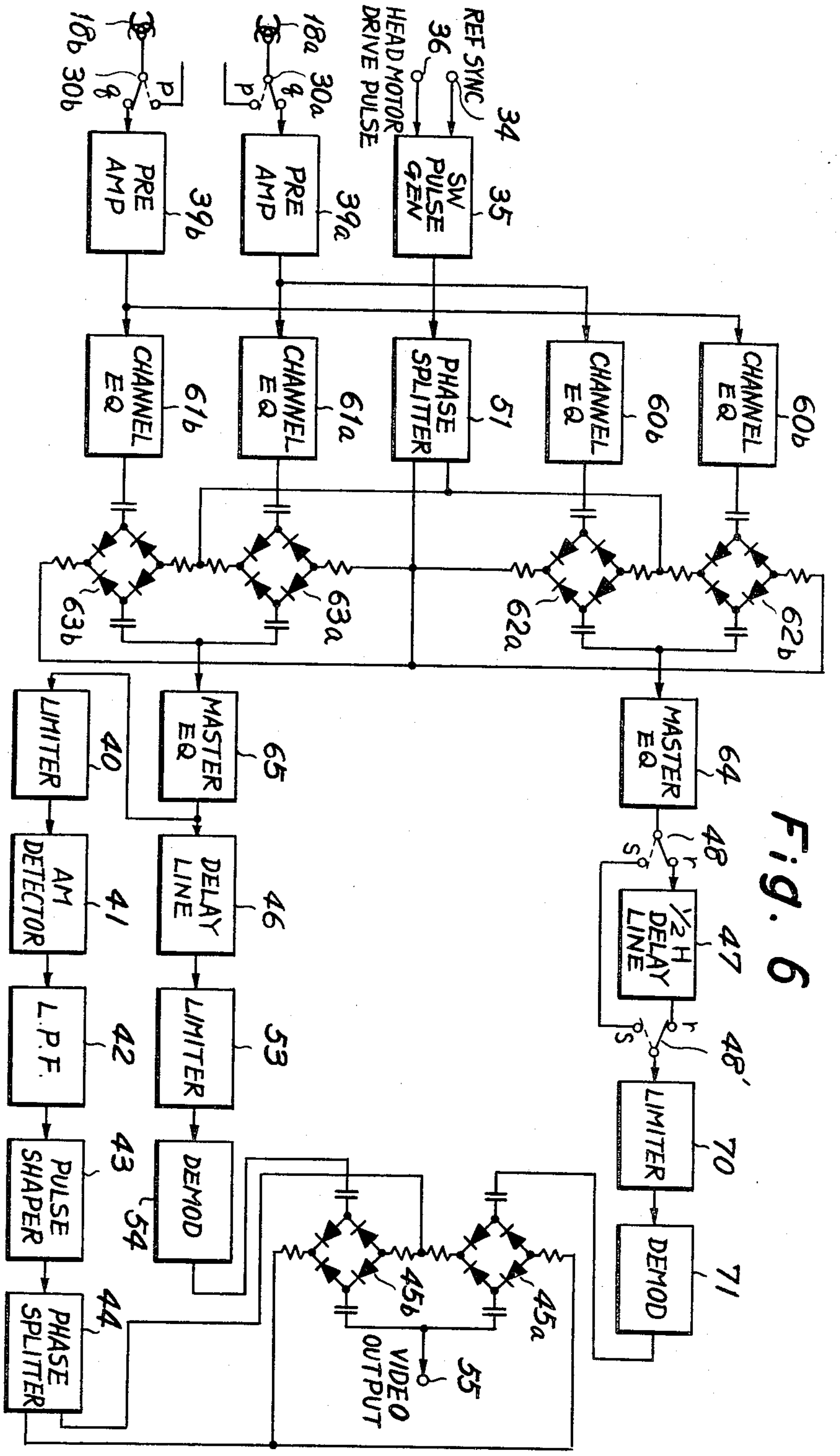

FIG. 5 is a block diagram of a second embodiment of the system according to this invention;

FIG. 6 is a block diagram of a third embodiment of the system according to this invention;

FIGS. 7A–H are graphs showing waveforms illustrative of a recording action of the recording and reproducing apparatus shown in FIG. 2;

FIGS. 8A–I are graphs showing waveforms illustrative of a slow motion reproducing action in the ratio of 3 : 1.

Figure 1:
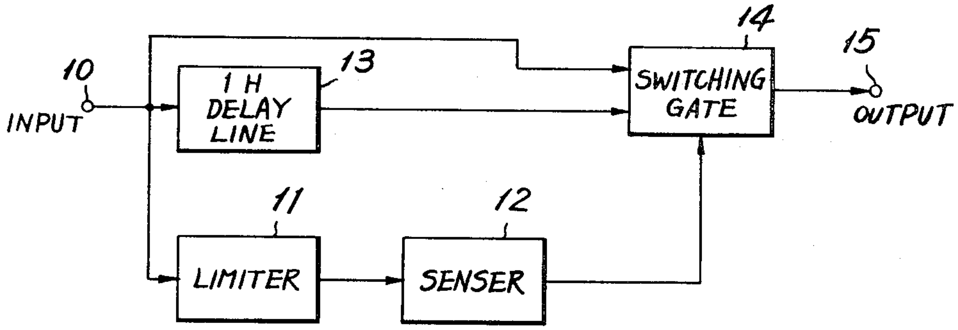
Fig. 1 PRIOR ART
FIG. 1 is a block diagram of a conventional video signal compensation system.

A conventional video signal compensation system, in current use for video tape recorders, is now shown in the block diagram of FIG. 1. A reproduced video signal having a dropout in it is applied on a terminal 10. The signal from the terminal 10 is limited in its amplitude variations through a limiter 11 and fed to a sensor 12. The sensor 12 generates a gate pulse when there is a dropout or other signal absence in the supplied signal. This gate pulse is supplied to a switching gate circuit 14. At the same time, the switching gate circuit 14 is fed by the reproduced signal, transmitted directly from the terminal 10 and by a signal delayed by 1H through 1H delay line 13. In the switching gate 14, any dropout signal in the directly supplied signal is provided by a portion of the signal received from the delay line 13 responsive to a gate pulse from the sensor 12. Thus the dropout is compensated. From a terminal 15, the compensated reproduced signal can be taken out.

According to the prior art as described, the signal absence portion, such as the dropout in the reproducing video signal is supplied by a delayed signal, portion received from circuit 13 which is substituted for the signal absence portion. Therefore the compensation is impossible when the signal absence extends over an interval which is longer than 1H as described hereinbefore. At this time, the absence portion is substituted for the delayed absence portion.

The present invention overcomes all the above described disadvantages of the conventional system. The system according to this invention will be illustrated hereinafter with reference to FIG. 2 and other drawings.

FIG. 2 shows a side elevation of an embodiment of a rotary magnetic disk type magnetic recording and reproducing apparatus (it is usually called a video disk recorder) which can be used for carrying the system of this invention into practice. A rotary magnetic disk 16 has magnetic surfaces on both upper and lower sides. The disk 16 is rotated at a rotation speed of 60 rps by a disk motor 17 rotating in synchronizing with a vertical synchronizing signal of a video signal. Recording and reproducing magnetic heads **18*a* and 18*b*, respectively, provide for first and second channels These heads are in contact respectively with the upper and lower surfaces of the disk 16. The video signal is recorded on or reproduced from the disk 16 by the magnetic heads 18*a* and 18*b***.

Pulse motors **19*a* and 19*b* rotate intermittently and alternately rotate feed screws 20*a* and 20*b* connected to their rotary shafts. Head supports 21*a* and 21*b* respectively threaded to the feed screws 20*a* and 20*b* are moved intermittently and axially along the screws by the alternate and intermittent rotation of the screws. Thus, the heads 18*a* and 18*b* fixed on the supports 21*a* and 21*b* are moved in alternate steps with certain intervals in radial direction of the disk 16. The heads 18*a* and 18*b* move inwardly intermittently and alternately from the outer to inner peripheries and reversely in opposite direction. Each field of the video signal is recorded on a concentrical circular track by each rotation of the disk 16. The intermittent movement of the heads 18*a* and 18*b* has a period in a multiple number of rotation period of the disk 16 conforming to one field period (16.7 m sec.) of a video signal. In normal recording, the period of movement of the heads 18*a* and 18*b*** are conformed to the period of one field of a video signal. Both heads record one field of the video signal on each track of the disk for one rotation thereof.

Figure 7:
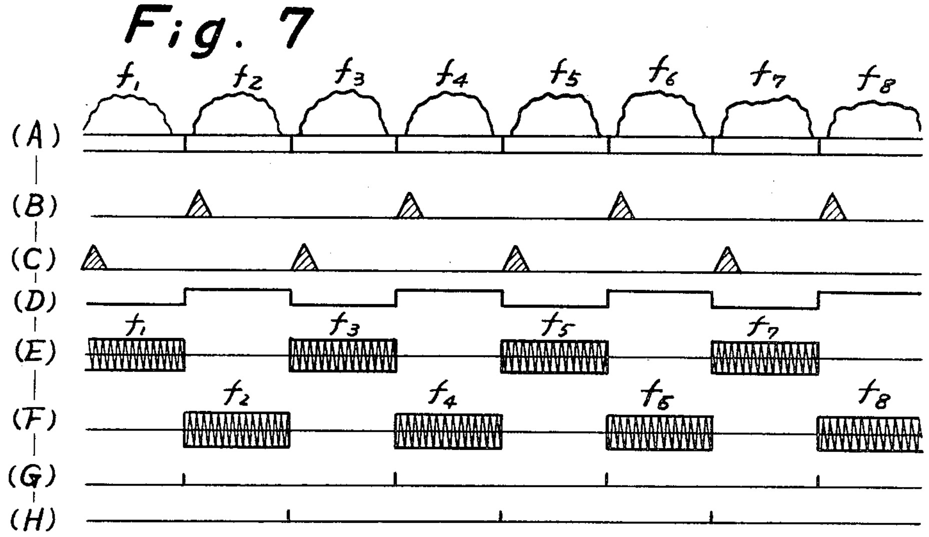

The relationship between the recording action of the head and the video signal is shown in FIGS. 7A–H. As shown in FIG. 7A, characters $f_1, f_2, f_3$, — denote each field of the video signal. Odd number fields $f_1, f_3$, — and even number fields of $f_2, f_4$, — are different from each other by a H/2 (31.75 $\mu$sec. in NTSC system) interval in horizontal scanning line cycle. The odd number field and the even number field are interlaced to form a frame. Upon recording, the heads **18*a* and 18*b* alternately repeat their moving and stopping actions at each field as shown in FIGS. 7B and 7C. Triangular portions in these figures show moving intervals of the head and horizontal linear portions show stopping intervals of the head. The recording video signals applied in the heads 18***a* and 18*b* are alternately recorded as shown in FIGS. 7E and 7F within the period of one field, and after each field the head is moved responsive to a switching pulse as shown in FIG. 7D.

In this way, the odd number fields $f_1, f_3$, — are recorded by the head 18*a* and the even number fields $f_2, f_4$— are recorded by the head 18*b*. The signal recorded by the head 18*a* and the signal recorded by the head 18*b* always have a phase difference of H/2, with respect to each other. As a result, the signals reproduced by the heads 18*a* and 18*b* are differed from each other by H/2 in the phase of scanning cycle.

For example, a slow motion reproducing of 3 : 1 may be attempted. In this case, the heads 18*a* and 18*b* are carried forward during a long period which is three times longer than that of the reproducing operation at normal speed times. Each head reproduces the same track during every long period. Accordingly, a one-third normal speed slow motion reproduced image picture may be obtained. While one head is quickly reproducing the same track, the other head is shifted to the next subsequent track. The other head reproduces the subsequent track simultaneously with the reproducing of the one head. Thus from each head every three fields of reproduced signals are taken out by switching during the stopping interval of the head.

The recording system as described above concerns a way of recording of a full field. By use of a field skipping recording system, the action will be made as follows. At the instant when the period of alternate movement of the heads 18*a* and 18*b* is twice then the period of the full field system, then the odd number field $f_1$ is recorded by the head 18*a* and the following even number field $f_2$ is not recorded. After this recording of the field $f_1$ the odd number field $f_3$ is recorded by the head 18*b*. Similarly the odd number fields $f_1, f_5, f_9$ — are recorded by the head 18*a* and the odd fields $f_3, f_7, f_{11}$ — are recorded by the head 18*b*. Thus, during reproduction, the recorded signals are twice reproduced, respectively, by heads 18*a* and 18*b*. Even number fields may be consecutively recorded by the heads 18*a* and 18*b* in a similar manner.

The system of the present invention can well be applied to the magnetic recording and reproducing apparatus of FIG. 2, as mentioned above.

A block diagram of an embodiment of the system according to the invention is shown in FIG. 3. In the recording, mode switches 30*a* and 30*b* are respectively connected to contacts *p*. An input recording video signal is supplied through an input terminal 31 to a frequency modulator 32. A FM signal from the frequency modulator 32 is introduced to switchinG gate circuits 33*a* and 33*b*. On the other hand, a reference synchronizing signal of an input video signal or a standard reference synchronizing signal is supplied from a terminal 34 to a switching pulse generator 35. Head motor drive pulses are also supplied thereto from a terminal 36. The head motor drive pulses are in the same time relationship as the pulses for driving the head pulse motors 19*a* and 19*b* and have a pulse relationship as shown in FIGS. 7G and 7H. The pulse generator 35 gates the synchronizing signal by the head motor drive pulse and generates a switching pulse which is synchronized with the head feeding as shown in FIG. 7D. The switching pulse is split into two-channel gate pulses of opposite polarities by a phase splitter 37 and thereafter the split signal is fed to the switching gate circuits 33*a* and 33*b*.

During the period of field $f_1$ shown in FIG. 7A, the head 18*a* is stopped and the head 18*b* is moved and then stopped after its moving. The output of the switching pulse generator 35 is biased to zero as shown in FIG. 7D. At this instant (i.e., during field $f_1$), a terminal $t_1$ is zero-biased and a terminal $t_2$ is positive-biased. Accordingly, the gate circuit 33*a* is ON, and the gate circuit 33*b* is OFF. Thus, the signal from the modulator 32 is gated through the gate 33*a*, then amplified in a recording amplifier 38*a*, and thereafter applied to the head 18*a* through the switch 30*a*. The head 18a records the signal on the upper surface of the disk 16. Then, during the period of field $f_2$, the head 18*a* is stopped after it has moved, and the head 18b remains in a stopped condition. Similar to the above case, the signal from the modulator 32 is gated through the gate circuit 33*b*, then amplified in a recording amplifier 38*b*, and thereafter applied to the head 18*b* through the switch 30*b*. The head 18*b* records the signal on the lower surface of the disk 16. Consecutively, as in the above-mentioned case, the odd number fields $f_3, f_5$ — are recorded on the upper surface of the disk 16 by the head 18*a* and the even number fields $f_4, f_6$ — are recorded on the lower surface of the disk 16 by the head 18*b*, respectively, all recording on concentric circular tracks.

Figure 4:
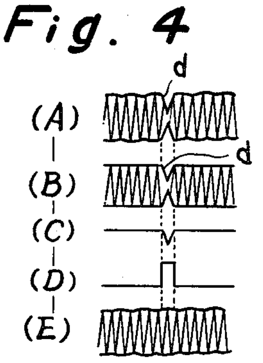

During the reproducing of the signal, the switches 30*a* and 30*b* are respectively connected to contacts *q*. The signal of the waveform as shown in FIG. 4A is reproduced simultaneously by the heads 18*a* and 18*b* while they are stopped. These signals are respectively applied through the switches 30*a* and 30*b* and amplified by reproducing pre-amplifiers 39*a* and 39*b* before being fed to limiter amplifiers 40*a* and 40*b*. In the amplifiers 40*a* and 40*b* the reproduced signal is amplified about 20dB and its amplitude variations are limited. The resulting signal has the waveform as shown in FIG. 4B. The outputs of the amplifiers 40*a* and 40*b* are fed to full-wave AM detectors 41*a* and 41*b*.

In case the output of the amplifiers 40*a* or 40*b* has a dropout signal d, as shown in FIG. 4A, its level is smaller than the limiting level. The detectors 41*a* and 41*b* are actuated to produce detecting signals as shown in FIG. 4C.

The detected signals from the detectors 41*a* and 41*b* are removed, with the remaining RF signal components, by the low-pass filters 42*a* and 42*b*. Thereafter, these signals are formed into switching pulses as shown in FIG. 4D by the pulse shapers 43*a* and 43*b*. These switching pulses are respectively split into two-channel gate pulses of opposite polarities, respectively, by phase splitters 44*a* and 44*b*. These pulses are respectively supplied to switching gate circuits 45*a*, 45'*a*, and 45'*b*, 45*b*.

To the switching gate circuit 45a, an output signal of the pre-amplifier 39*a* of the first channel is supplied after being passed through a delay line 46*a*. To the switching gate circuit 45'*a*, an output signal of the pre-amplifier 39*b* of the second channel is supplied after passed through a H/2 delay line 47*a* via switches 48*a* and 48'*a* connected to their contacts *r*. Similarly, an output signal of the pre-amplifier 39*b* is supplied to the switching gate circuit 45*b* after being passed through a delay line 46*b*. To the switching gate circuit 45'*b*, an output signal of the pre-amplifier 39*a* is supplied after passed through a H/2 delay line 47*b* via switches 48*b* and 48'*b* connected to contacts *r*. The delay lines 46*a* and 46*b* respectively correct the relative delay differences of the H/2 delay line 47*a* and 47*b*.

In case the video signal is recorded by the full field recording system, the signal reproduced by the head 18*a* of the first channel and the signal reproduced by the head 18*b* of the second channel are differed from each other by H/2 in phase. To have the phase of the compensating signal in conformity with the phase of the signal to be compensated, the above-mentioned H/2 delay lines 47*a* and 47*b* are employed.

In case the video signal is recorded by the field skip recording system, the scanning phase of signals reproduced by the heads 18*a* and 18*b* of the first and second channels are conformed with each other. Then, in the field skip recording system, the H/2 delay lines are not necessitated, and the switches 48*a*, 48'*a* and 48*b*, 48'*b* are all connected to the contacts *s*. The signals are by-passed relative to the H/2 delay lines 47*a* and 47*b*.

Normally, in case the signal from the head 18*a* is reproduced, the output of the pulse shaper 43*a* is zero-biased. Of the outputs appearing at output terminal $t_3$ and $t_4$ of the phase splitter 44*a*, the output of the terminal $t_3$ is positive-biased, and the output of the terminal $t_4$ is zero-biased. Accordingly, the gate circuit 45*a* is ON and the gate circuit 45'*a* is OFF. The signal of the first channel reproduced by the head 18*a* is supplied through the gate circuit 45*a* to a channel equalizer 49*a*. The signal of the second channel reproduced from the head 18*b* is similarly supplied through the gate circuit 45*b* to a channel equalizer 49*b*.

Here, if the reproduced signal from the head 18*a* has the dropout signal *d* as described, the pulse shaper 43*a* will generate the switching pulse. The phase splitter 44*a* is supplied with the switching pulse. The terminal $t_3$ of the splitter 44*a* is zero-biased, and the terminal $t_4$ is positive-biased. During the presence of the switching pulse, the signal supplied from the pre-amplifier 39*b* of the second channel is delayed by H/2 as it passes through the H/2 delay line 47*a* to the switching gate circuit 45'*a*. As a result, the output of the pre-amplifier 39*a* of the first channel is inserted in lieu of the output of the pre-amplifier 39*b* of the second channel during an interval while there is a dropout of the signal, as shown in FIG. 4E.

Therefore, the output of the channel equalizer 49*a* is the compensating signal which is substituted for the dropout signal. At this instant, as the compensating signal passing through the gate circuit 45'*a* is delayed by H/2, this compensating signal does not produce a phase difference with the signal passed through the gate circuit 45*a*.

The dropout in the signal reproduced by the head 18*b* of the second channel can also be compensated by the output from the pre-amplifier 39*a* of the first channel in the similar manner, as described.

As the signals reproduced by the heads 18*a* and 18*b* respectively form signals of adjacent fields, both of the signals have similar and interrelated information. The information to be reproduced in a picture will not vary responsive to the compensation of the dropout in a field signal by the substitution of a signal of the corresponding portion of the other field signal.

The signals are equalized in their frequency characteristics by the channel equalizers 49*a* and 49*b*, respectively, and introduced to switching gate circuits 50*a* and 50*b*. On the other hand, the switching pulse generated responsive to the head movement is supplied from the switching pulse generator 35 to a phase splitter 51. Gate pulses derived from the phase splitter 51 are split into two pulses of opposite polarities which are supplied to the gate circuits 50*a* and 50*b*. When the output terminal $t_7$ of the pulse generator 35 is zero-biased, a terminal $t_5$ of the phase splitter 51 is zero-biased and a terminal $t_6$ is positive-biased. The gate circuit 50*a* is then turned ON and the gate circuit 50*b* is turned OFF. Therefore, the output signal of the channel equalizer 49*a* is passed through the gate circuit 50*a* to a master equalizer 52 for the period of one field. As the output of the pulse generator 35 turns positive-biased, the output signal of the channel equalizer 49b is passed through the gate circuit 50*b* to the master equalizer 52 for the period of the next subsequent one field. Similarly, the odd numbered fields and the even numbered fields are alternately switched and taken out. The signal is completely corrected of its frequency characteristics by the master equalizer 52, and then its amplitude variations are removed by a limiter 53. The output signal of the limiter 53 is demodulated by a demodulator 54. Then a complete video signal, compensated of the dropout, is taken out from an output terminal 55.

A second embodiment of the system embodying the present invention will now be explained with reference to FIG. 5. The same reference characters designate similar parts in FIGS. 3 and 5 and description thereof is omitted at this point. The recording operation is similar to the corresponding operation in the above embodiment shown in FIG. 3, thus, the description thereof is also omitted.

Figure 8:
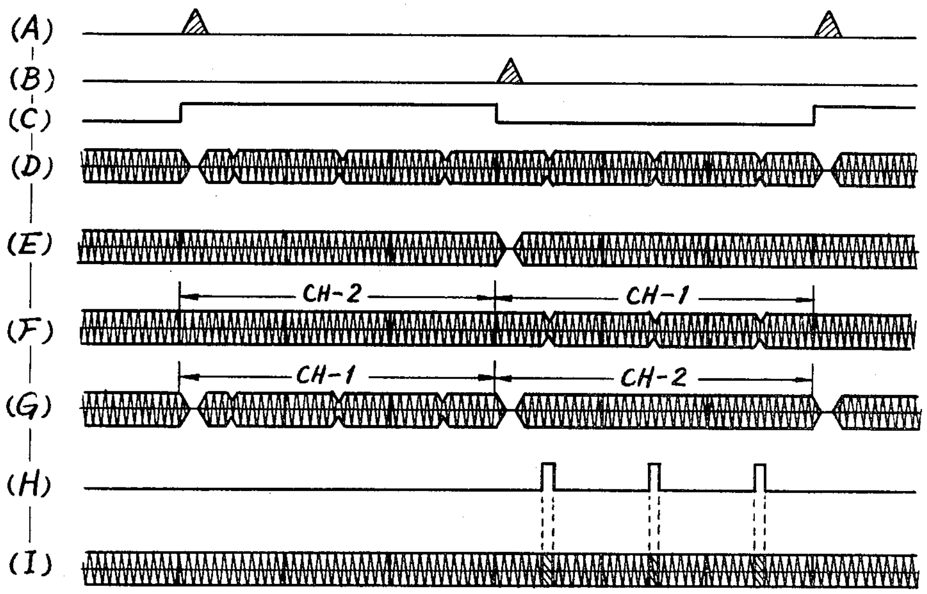

In this embodiment the reproducing is explained for example as a slow motion reproducing at the ratio of 3 : 1. The heads 18*a* and 18*b* intermittently move at a cycle which is three times that of normal reproduction shown in FIGS. 8A and 8B. The reproduced signal shown in FIG. 8D is applied through the pre-amplifier 39*a* of the first channel and is equalized in its frequency characteristic difference by channel equalizers 60*a* and 61*a*. Thereafter, the equalized signals are fed respectively to switching gate circuits 62*a* and 63*a*. In a similar way, the reproduced signal shown in FIG. 8E is applied through the pre-amplifier 39*b* of the second channel and is equalized by channel equalizers 60*b* and 61*b*. These equalized signals are respectively fed to switching gate circuits 62*b* and 63*b*.

The output pulse of the switching pulse generator 35, as shown in FIG. 8C, is split into two pulses of opposite polarities by the phase splitter 51. Then the split pulses are thereafter supplied to switching gate circuits 62*a*, 62*b* and 63*a*, 63*b*. These pulses switch the signals which are fed from the pre-amplifiers 39*a* and 39*b* and avoid the head feeding period. From these switching gate circuit s 63*a* and 63*b*, the signals as shown in FIG. 8F are obtained. From the switching gate circuits 62*a* and 62*b*, the signals as shown in FIG. 8G are obtained.

The outputs of the gate circuits 62*a* and 62*b* differ from the outputs of the gate circuits 63*a* and 63*b* H/2 in phase. The outputs of the gate circuits 63*a* and 62*b* are corrected of their frequency characteristics by a master equalizer 64 and then fed to the H/2 delay line 47 through the switch 48 connected to the contact r. The signal is delayed by H/2 in the H/2 delay line and then supplied to the switching gate circuit 45*a* through the switch 48' connected to the contact *r*. As for the field skip recording, the switches 48 and 48' are connected to the contacts *s*, and the signals are by-passed around and do not pass through the H/2 delay line 47.

On the other hand, the output signals of the gate circuits 63*a* and 63*b* are corrected of their frequency characteristics by a master equalizer 65 and then fed to the delay line 46 in which the signals are delay by amounts relative which are to the difference of the delay in the H/2 delay line 47. The output of the delay line 46 is supplied to the switching gate circuit 45*b*. Also, the amplitude level variations in the output of the master equalizer 65 is removed by the limiter 40, and the resultant signal is supplied to the AM detector 41. If a signal dropout is present in the output signal of the limiter 40, the remaining RF components are removed from the detected 41 generates a detecting signal. The detecting signal by the low-pass filter 42. Thereafter, it is wave-formed by the pulse shaper 43 to become a switching pulse as shown in FIG. 8H. The switching pulse is split into two pulses of opposite polarities by the phase splitter 44, and they are respectively supplied to the switching gate circuits 45*a* and 45*b*.

In case a dropout signal does not appear in the output of the delay line 46, an output is obtained from the switching gate circuit 45*b*. On the contrary, if a signal dropout does appear in the output from the delay line 46, an output signal is obtained from the switching gate circuit 45*a* which is enabled by the switching pulse of the phase splitter 44. Therefore, the limiter 53, which is supplied outputs of the switching gate circuits 45*a* and 45*b*, produces a continuous signal which is a composite wherein a compensated signal is substituted for the dropout as shown in FIG. 8I. The signal which has had its level variations removed by the limiter 53 is demodulated by the demodulator 54. The demodulated signal which has been fully compensated for the dropout signal is taken out at the output terminal 55, as a complete reproduced video signal.

The circuit of second embodiment of the invention is simplified and has less structural parts as compared with the first embodiment as described above.

A third embodiment of the system embodying the present invention will now be explained with reference to FIG. 6. Also, the same reference characters designate similar parts in FIGS. 3, 5 and the 6, and description thereof is omitted at this point. In this embodiment, the circuits between the master equalizers 64 and 65 and the heads 18*a* and 18*b* are the same as that of the above second embodiment.

The output from the master equalizer 65 passes through the delay line 46 to the limiter 53 and demodulator 54 and then to the switching gate circuit 45*b*. On the other hand, the output of the master equalizer 64 passes through the H/2 delay line 47, the limiter 70 and demodulator 71 to the switching gate circuit 45*a*. The output terminal 55 is supplied with a signal which is demodulated by the demodulator 54 and passed through the gate circuit 45*b* in case a signal dropout does not existing in the output of the master equalizer 65. In case a signal dropout does exist in the output of the master equalizer 65, the output terminal 55 is supplied with a signal which is demodulated by the demodulator 71 and switched through the gate circuit 45*a* responsive to the switching pulse from the phase splitter 44. Thus, the reproduced signal contains a substitute signal which completely compensates for the signal dropout, and this composite signal is obtained from the output terminal 55.

In the above described first and second embodiments, the signals switched by the switching gate circuits 45*a*, 45'*a* and 45*b*, 45'*b* (shown in FIGS. 3 and 5) occasionally contain transient noises produced by charging or discharging currents appearing at the ON-OFF switching of the diodes forming the gate circuits. The limiter 53 is normally limiting-amplifying a signal more than 40dB. The above-mentioned transient noise is also amplified by the limiter 53, and the noise is mostly mixed into the output video signal. In the third embodiment, the limiters 53 and 70 are respectively inserted into the circuit before the switching gate circuits 45*a* and 45*b*. Therefore, the output signal of the gate circuits 45*a* and 45*b* does not thereafter experience an amplification of large gain. Therefore, the transient noise, responsive to the diode switching is very small in the output signal.

Throughout all the embodiments, it may be noted that the signal dropout cannot fully be compensated if it is accidentally produced in the reproduced signal of other head during movement of one head. However, a signal reproduction can be more or less made even when the head is moving out of a guard band between tracks. Thus the signal compensation can be completely made almost all of the time. Specifically during the slow motion reproduction, the probability is even smaller that a signal dropout may exist in the reproduced signal of other head during movement of one head since as the slow motion ratio is large.

Variations and modifications may be used for carrying the invention into practice. Therefore, the claims should not be confined to the above described embodiments, but they should be construed to include all equivalents which do not depart from the spirit and scope of the invention.

What we claim is:

1. A system for compensating for loss of signal strength during the playback of a magnetic recording and reproducing apparatus, said system comprising means for simultaneously playing back signals recorded in each of a plurality of channels recorded on separated areas of a magnetic medium, said channels having periodic and interrelated information signals recorded therein, and means responsive to a loss of signal strength in one of said channels for substituting therefor a corresponding signal from the other of said channels.

2. The system of claim 1 and first switching means for taking out the signals reproduced from one of said channels in one of said areas during a predetermined period, means responsive to a loss of said signal for generating a switching pulse having a width equal to the duration of the loss of signal, second switching means for taking out the signals reproduced from another of said channels in another of said areas, said loss responsive means comprising means responsive to said switching pulse for operating said switching means to substitute the signal from said other channel for the signal from said one channel, and output circuit means for accepting both the signal from said one channel and the substituted signal from the other channel, thereby providing a single signal having compensation for said loss of signal.

3. A signal compensation system in a recording and reproducing apparatus, said system comprising means for respectively and simultaneously reproducing signals recorded in each of a plurality of channels, said channels having periodic and interrelated information signals recorded therein, first switching means for alternately taking out during a predetermined period the signals of the plurality of channels as said signals are reproduced by the reproducing means, means for generating a switching pulse having a pulse width corresponding to an interval while there is a loss of signal strength, second switching means operated responsive to the switching pulse and only during an interval corresponding to the width of said switching pulse for taking out other signal from a channel other than the channel taken out by the first switching means, and output means for selectively accepting the signals passed through said first and second switching means for obtaining an integrated output signal, said output signal having the other signal substituted for the lost signal.

4. The system of claim 3 in which said recording and reproducing apparatus comprises a rotary recorded medium, a plurality of recording and reproducing heads, means for alternately and intermittently stepping said heads across said medium, and means for rotating said medium in synchronism with a period recurring in the recording signal, said plurality of heads recording and reproducing the signals of respectively corresponding channels on and from said medium.

5. A signal compensation system in a recording and reproducing apparatus, said system comprising means for respectively and simultaneously reproducing signals of two channels, first switching means for alternately taking out signals of every field from the signals of the two channels reproduced by the reproducing means, means for generating a switching pulse having a pulse width corresponding to an interval during which the signal of the channel taken out by the first switching means has a level below a predetermined level, delay means for delaying the signals of the two channels reproduced by the reproducing means for a period equal to H/2, second switching means for selectively passing either the signal of the channel taken out by the first switching means or the output signal of the delay means, said second switching means being normally operated to pass the signal taken out by the first switching means during an interval corresponding to the width of the switching pulse, and output means for taking out the signal passed through said first and second switching means, said output signal taken from said output means being a compensated signal comprising a substitution of a signal in the corresponding part of the other channel for the signal below said predetermined level.

6. The system of claim 5 and means for short-circuiting said delay means responsive to signals reproduced by the reproducing means when said signals comprise field signals of either an even number or an odd number recorded by a field skip recording apparatus, whereby said signal is by-passed around said delay means via said short-circuit.

7. The system of claim 5 in which said switching pulse generating means and said delay means are respectively provided in transmission paths over which signals from the two channels are transmitted from the signal reproducing means to the first switching means, means whereby said generating means generates the switching pulse when the signal strength in the channel taken out by the first switching means falls below said predetermined level, and said first switching means is supplied with an output of the second switching means.

8. The system of claim 5 which further comprises third switching means for taking out a field signal for every alternate field which is not taken out by the first switching means from the signals of the two channels reproduced by the reproducing means, said delay means being connected to the output side of the third switching means, said switching pulse generating means being connected to the output side of the first switching means, and said second switching means being connected to the output sides of the second and third switching means.

9. The system of claim 8 in which said reproduced signal is a modulated signal, and which further comprises limiter means for limiting and amplifying the output of the second switching means, and demodulating means for demodulating the reproduced modulated signal.

10. The system of claim 8 in which said reproduced signal is a modulated signal, and which further comprises limiter means for limiting, amplifying, and demodulating said modulated signal, said limiter being connected from a point between the delay means and the second switching means to a point between the first switching means the the second switching means.

* * * * *